April 19, 1966 L. A. MADDEN 3,246,546
POWER TOOL SAFETY ASSEMBLY
Filed June 27, 1963 4 Sheets-Sheet 1
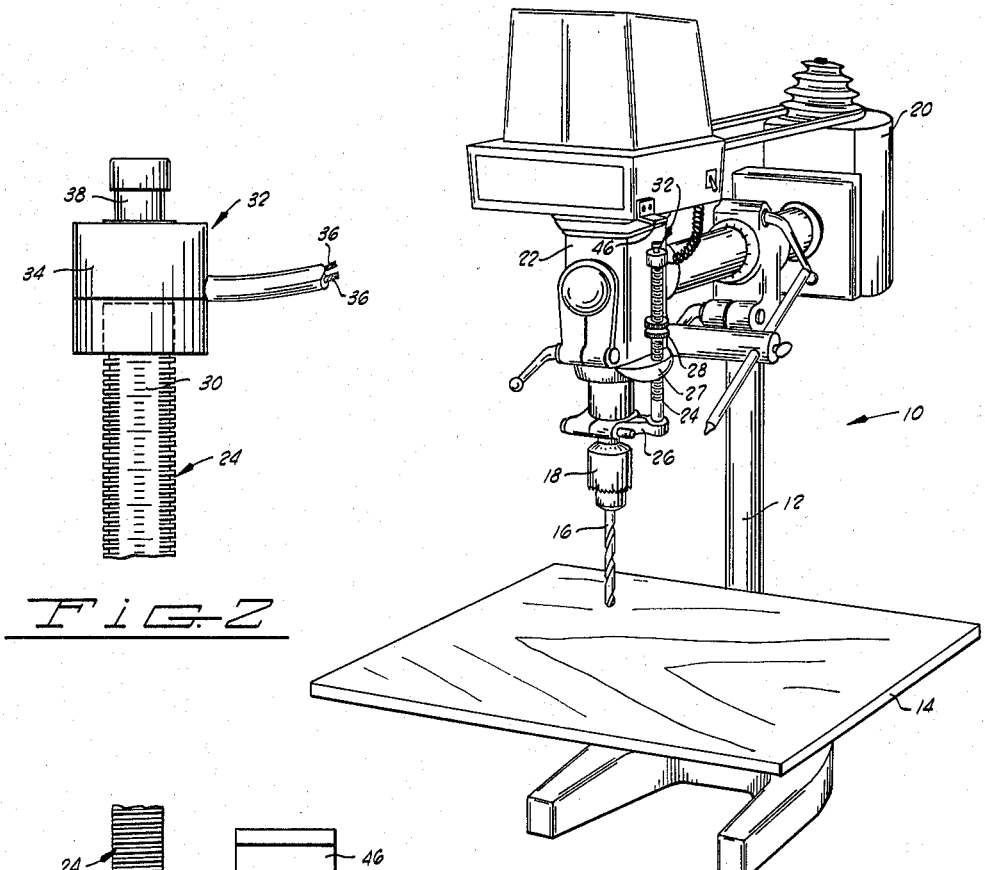
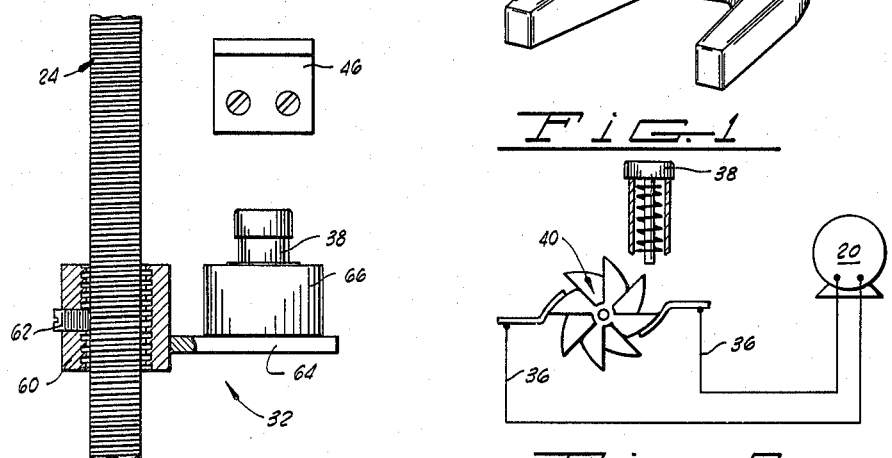
INVENTOR.
LEMUEL A. MADDEN
BY
ATTORNEYS April 19, 1966  L. A. MADDEN  3,246,546
POWER TOOL SAFETY ASSEMBLY
Filed June 27, 1963  4 Sheets-Sheet 2

INVENTOR.
LEMUEL A. MADDEN
BY
ATTORNEYS

April 19, 1966  L. A. MADDEN  3,246,546
POWER TOOL SAFETY ASSEMBLY
Filed June 27, 1963  4 Sheets-Sheet 3
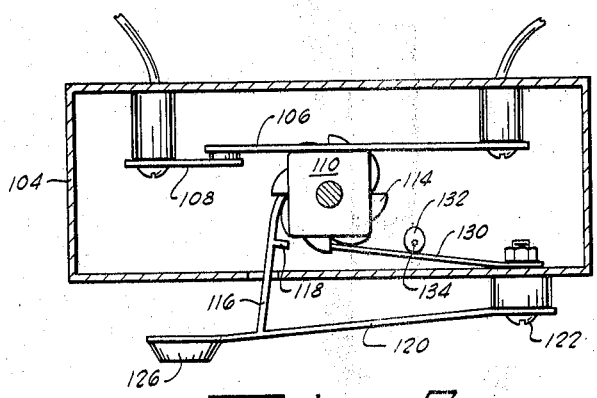
_Fig-7_
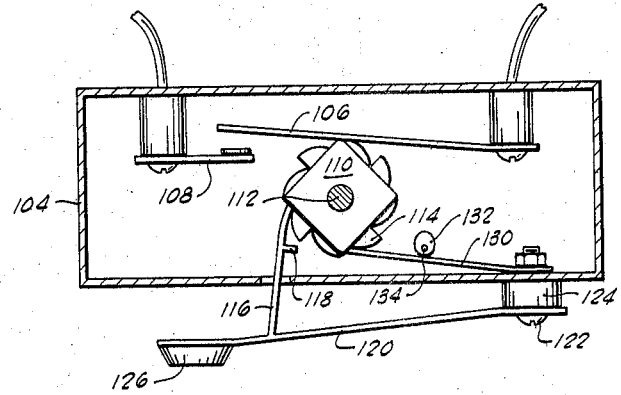
_Fig-8_
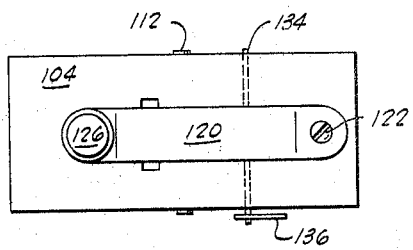
_Fig-9_
INVENTOR.
LEMUEL A. MADDEN
BY
Dunlap, Laney & Hubbard
ATTORNEYS

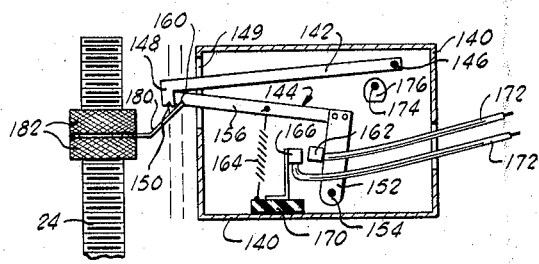
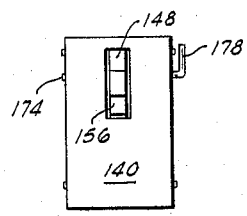
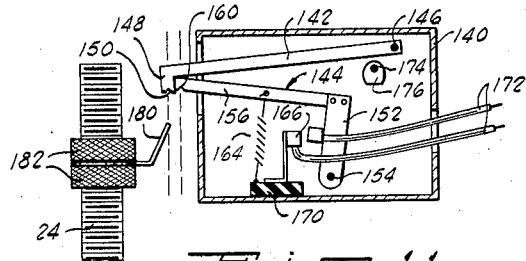
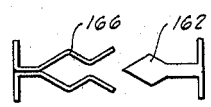
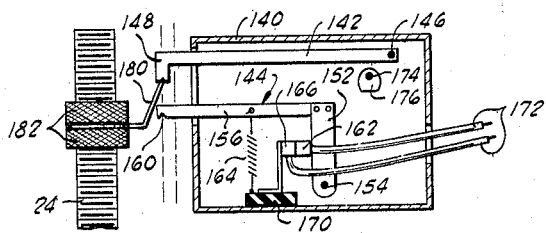
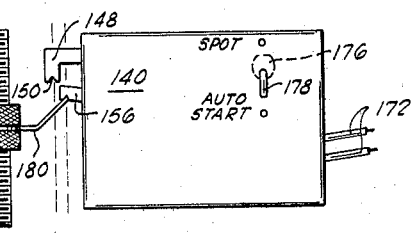
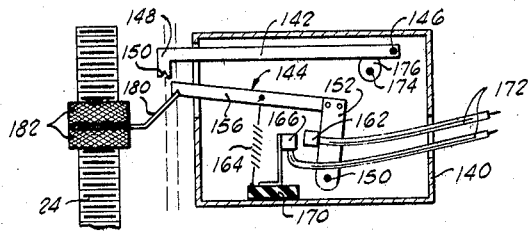

3,246,546
POWER TOOL SAFETY ASSEMBLY
Lemuel A. Madden, 4605 S. Melrose,
Oklahoma City, Okla.
Filed June 27, 1963, Ser. No. 291,606
19 Claims. (Cl. 77—5)

This application is a continuation-in-part of application Ser. No. 250,526, filed Jan. 10, 1963, and now abandoned.

This invention relates to power tools of the type having a saw, drill or other rapidly rotating member which is mounted upon a stand or support for reciprocation in a direction toward and away from a workpiece which is supported upon a platform upon the stand. More particularly, the invention relates to improvements in certain power tool assemblies of the type described which permit such tools to be used with greater safety and more efficiency. In a more specific aspect, the invention relates to the provision of means in a power tool assembly for automatically de-energizing the motor used to drive the cutting or piercing implement of the power tool at times when the tool is not in use, and conversely, to automatically and quickly energize the motor for driving the tool at the time when it is desired to use the tool for performing a cutting or piercing operation upon a workpiece.

It is well-known that the operation of certain types of power tools, such as drill presses and radial saws, presents a serious safety problem in that artisans or operators of the tools may inadvertently permit some member or part of the body to come in contact with the saw or drill bit while it is rapidly rotating, thereby resulting in serious injury. Various safety devices have been provided heretofore for minimizing the risks or likelihood of occurrence of accidents of the type described. Such safety devices include shields, warning lights, etc. It has been generally characteristic of such devices, however, that the switch which is utilized for energizing the electrical motor which drives the cutting element of the tools in rotation has been relatively inaccessible to the operator so that the operator must move from his operative position in which he manipulates a workpiece to a second position behind or to the side of the tool in order to turn the power to the tool on or off. Moreover, the switch has generally been of a type which requires a separate positive action by the operator to open and to close the circuit to the electrical motor, thus requiring the operator's attention in each case and his momentary distraction from the workpiece and from the cutting element of the tool.

The present invention provides a simple and inexpensive improvement in power tool assemblies of the type described which will permit an operator to concentrate more attention upon the workpiece which is being subjected to the action of the tool, and which will not require him to move from the position assumed for manipulating the workpiece in order to energize or deenergize the motor which drives the cutting element of the tool. The invention provides for the automatic energization and de-energization of the electric motor used to drive the cutting element at such times as it is desired to start or stop the rotation of the cutting element. Moreover, the invention permits tools of the type described to be used more efficiently and accurately in that it is a simple and substantially automatic procedure for the operator to stop the rotation of the cutting element at such times as it is desired to align this element with the workpiece, or otherwise to prepare the workpiece for actual cutting or piercing thereof by the cutting element.

In one embodiment of the invention, the improved power tool assembly employs a specific type of switch which is mounted in the path of reciprocation of the cutting element of the power tool assembly so that the switch may be contacted by the reciprocating head which supports or carries the cutting element at such times as this head moves through a certain extent of reciprocating travel. The switch assembly which is employed in the invention comprises a switch which has a common actuating element in the form of a projecting stem, and which has contact elements which are sequentially closed by consecutive depressions or reciprocations of the stem to alternately open and close the electrical circuit to the electric motor used to drive the cutting element of the tool. In other words, the switch assembly is a type which may be used to automatically alternately open and close the circuit to the electrical motor of the tool upon successive or consecutive contacts by the head which carries the cutting element of the tool as such head is reciprocated away from the workpiece.

In another embodiment of the invention, the switch assembly used is a dual type in which the switch may be placed in a sequential open-close status of the type described, or may be shifted to a status in which it will be closed each time the cutting element of the power tool moves toward the workpiece and opened each time it is moved away from the workpiece.

Although it is appreciated that various types of limit switches have hereinbefore been employed in power tools for the purpose of energizing or de-energizing a motor, an alarm, a light or other electrical device when a portion of the tool is moved from one position to another, to the best of my knowledge, there has not heretofore been used a switch assembly of the type proposed by the present invention in which the same or a common actuating element of the switch assembly may be employed to automatically start and stop the electrical motor which drives the cutting element of the tool upon successive actuations of the switch assembly.

By virtue of the nature of the operation of the switch assembly used in the power tool assembly of the present invention and its location relative to the path of reciprocation of the cutting element of the tool, the present invention substantially enhances the safety with which power tools of the described type may be used in that the operator need not move from the position best adapted for manipulation of the workpiece in order to energize or de-energize the electrical motor. Moreover, the ease with which the switch assembly may be utilized for energizing or de-energizing the motor permits the operator of the tool to more accurately and efficiently use the tool by permitting him to properly align the workpiece relative to the cutting element of the tool, and then retain such alignment while permitting the tool to become automatically actuated through the use of the proposed switch assembly.

From the foregoing description of the invention it will be apparent that a major object of the invention is to provide a power tool assembly which may be used with enhanced safety.

An additional object of the invention is to provide an improvement in power tool assemblies which permits such tools as power saws, drill presses and the like to be used with a greater degree of accuracy and efficiency.

A further object of the invention is to provide a simple, inexpensive and durable attachment which may be incorporated in power tool assemblies for improving the safety with which such apparatus may be used and for generally achieving the objects hereinbefore described.

Another object of the invention is to provide a power tool assembly of the type in which a cutting or piercing member is driven in rotation or oscillation, and is reciprocated toward and away from a workpiece, in which power tool assembly the movement of the cutting member away from the workpiece may optionally be caused to either consecutively energize and de-energize the motor of the tool, or to repeatedly de-energize the motor, either type of action being automatic in nature.

In addition to the foregoing described objects and advantages, other objects will become apparent upon reading the following detailed description of the invention in conjunction with the accompanying drawings which illustrate the invention.

In the drawings:

FIGURE 1 is a perspective of a drill press constructed in accordance with the teachings of the present invention.

FIGURE 2 is a view in elevation of a detail of the invention showing the manner in which the switch assembly of the invention is utilized in combination with certain specific elements of the drill press.

FIGURE 3 is a circuit diagram illustrating the manner in which the switch assembly of the present invention is incorporated in an electrical circuit whch includes the electric motor used for powering a power tool assembly constructed in accordance with the present invention.

FIGURE 4 is an elevational view of a detail of the invention showing a drill press modified mounting arrangement for a slightly modified switch assembly constructed in accordance with the present invention.

FIGURE 7 is a sectional view through the center of a modified switch which is used in another embodiment of the invention as the switch appears in one operating position.

FIGURE 8 is a sectional view through the center of the switch shown in FIGURE 7 but illustrating the switch in a second operating position.

FIGURE 9 is a plan view of the under side of the switch shown in section in FIGURES 7 and 8.

FIGURES 10–14 are sectional views through the center of another type of switch used in another embodiment of the invention and showing the switch in different operating positions.

FIGURE 15 is an end view of the switch illustrated in section in FIGURES 10–14.

FIGURE 16 is a detail drawing illustrating the preferred type of electrical contacts used in the switch illustrated in FIGURES 10–15.

FIGURE 17 is a view in elevation of the switch illustrated in FIGURES 10–15 showing the switch as it appears when viewed from one side thereof.

Figure 5:
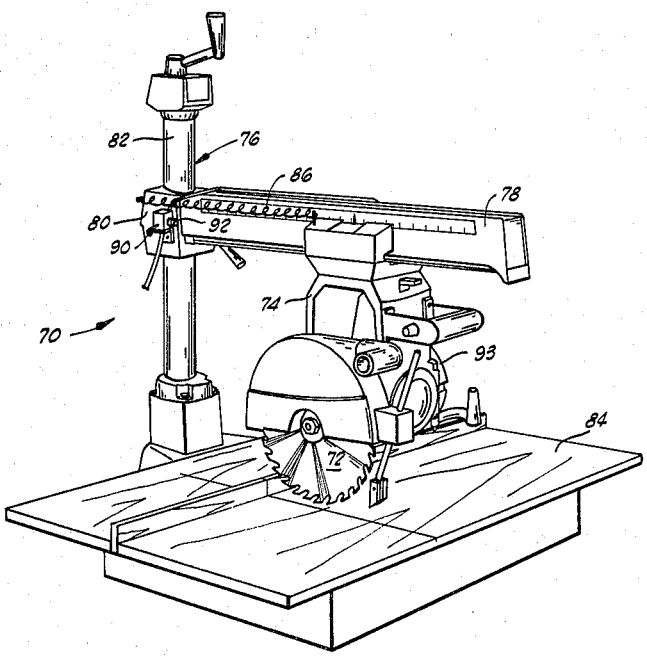
FIGURE 5 is a perspective view of a radial saw constructed in accordance with the present invention.

Referring now to the drawings in detail, and particularly to FIGURE 1, reference character 10 generally designates a drill press assembly incorporating the improvement of the present invention. The drill press includes a supporting stand 12 which has a platform 14 upon which a workpiece may be supported. A drill bit 16 is clamped in a chuck 18 and is mounted on the stand 12 for reciprocation along a line coinciding with its longitudinal axis. The bit 16 is driven in rotation by an electrical motor 20. Contained within a head assembly 22 which supports the chuck 18 is a spring (not seen) or other suitable biasing means which serves to bias the drill bit 16 towards its uppermost position so that a positive downward force must be applied by the operator in order to move the drill bit 16 into a workpiece.

In order to permit the depth to which the workpiece will be drilled to be accurately controlled, an externally threaded graduated indexing bar 24 is reciprocally mounted upon the stand 12 and is secured through a connecting member 26 to the head assembly 22 which carries the drill bit 16. The indexing bar 24 extends parallel to the drill bit 16 and is slidably journaled in a shoulder 27 carried by the head assembly 22 to permit the indexing bar to move in reciprocation with the drill bit 16. In order to restrict the drill bit 16 to a predetermined depth of drilling, an internally threaded indexing annulus or nut 28 is threaded on the indexing bar 24 and may be adjusted in its axial position on the indexing bar to restrict the distance which the indexing bar 24 may slide through the shoulder 27. In a well-known form of indexing bar used on drill presses commercially available at present, the external threads of the bar 24 are interrupted, and two sides of the bar are relieved and are graduated with a scale 30 as shown in FIGURE 2. The scale 30 is calibrated to read directly in inches or centimeters corresponding to the depth of the hole which the drill bit 16 will drill in the workpiece when the indexing annulus 28 is aligned with a particular one of the scale markings.

The elements of the drill press which have thus far been described are conventional and are to be found in many of the drill presses presently commercially available. As previously explained, however, drill presses of this type have heretofore presented some problems in operational safety and, to some extent, in the ease with which they may be operated in aligning the drill bit with the exact point on the workpiece where it is desired to drill a hole. To the end of substantially improving the safety with which drill bits of the type described may be operated, and the ease and facility with which the bit may be aligned with the exact point at which it is desired to drill, the present invention provides in combination with the drill press elements hereinbefore described, a novel switch assembly designated generally in the embodiment of the invention illustrated in FIGURES 1 and 2 by reference character 32. This embodiment of the switch assembly 32 comprises an internally threaded metallic cap 34 which is dimensioned to threadedly engage the upper end of the graduated indexing bar 24. The switch elements proper of the switch assembly 32 are enclosed within the metal cap 34 and are of any suitable type which will function to permit an electrical circuit including the electrical leads 36 to be first closed and then opened upon successive depressions of a reciprocating stem or protuberance 38 which projects from the top of the metallic cap 34. A switch of this general type is schematically illustrated in the circuit diagram shown in FIGURE 3 of the drawings. It will be observed in referring to FIGURE 3 that depression of the stem 38 causes the cammed member 40 to rotate, with the successive increments of rotation of the cammed member bringing contacts on the ends of the leads 36 successively into electrical communication to make the circuit, and then shorting the leads to break the circuit. Switches of this general type are well-known in the art.

In order to effect the sequential energization and de-energization of the motor 20 which drives the drill bit 16 in rotation, a stop plate 46 is secured to the head assembly 22 of the drill press and projects outwardly therefrom in a plane extending normal to the path of reciprocation of the graduated indexing bar 24. The plate 46 is positioned sufficiently high on the head assembly 22 to assure that the graduated indexing bar 24 and drill bit 16 will be permitted sufficient freedom of reciprocating movement toward and away from a workpiece resting on the platform 14.

The operation of the invention may be perceived by reference to FIGURES 1 and 2 and to the electrical circuit diagram illustrated in FIGURE 3. When an operator desires to drill into a workpiece positioned on the platform 14, the motor 20 will normally be de-energized prior to the time of drilling. This will mean that the switch assembly 32 is in an off, or circuit breaking, status. In aligning the bit with the exact point on the workpiece where the hole is to be drilled, the operator may then pull the head assembly 22, chuck 18 and drill bit 16 downwardly until the point of the bit touches the exact mark on the workpiece 14 where it is desired to drill. The workpiece is then firmly secured in this position and the drilling operation may be commenced.

To start the drill rotating, the operator need merely release the head assembly 22, chuck 18 and drill bit 16 to allow these members to be reciprocated upwardly under the influence of the spring or other biasing member (not shown) contained in the head assembly 22. As the described elements move upwardly, the graduated indexing bar 24 is also moved upwardly until the stem 38 of the switch assembly 32 carried at the upper end thereof contacts and is depressed by the plate 46. Upon depression of the switch stem 38, the cam member 40 is rotated to bring its active contacts into alignment and contact with the terminals of the conductors 36. This position of the switch assembly 32 is illustrated in FIGURE 3. The circuit to the electrical motor 20 is thus automatically closed and rotation of the drill bit 16 is commenced. The operator then again slowly pulls the drill bit 16 downwardly until the point of the bit begins to bite into the workpiece. The application of downward pressure is continued until the drilling of the hole is completed. At this point the operator merely releases the head assembly 22, chuck 18 and drill bit 16 to permit these elements to again be biased upwardly along with the indexing bar 24 until the stem 38 of the switch assembly 32 contacts the plate 46. Upon depression of the stem 38, the cam 40 of the switch assembly is again rotated to break the circuit to the electrical motor 20.

It will be apparent from the foregoing description of the invention that the combination with the described switch assembly 32 with the drill press elements according to the specified arrangement permits the drill press to be used with considerably greater safety and with more accuracy and efficiency. If, as frequently happens, the drill bit 16 becomes hung in the workpiece so as to overload the motor 20, or if the hanging of the bit causes the workpiece to be forced out of the hands of the operator, the motor 20 may immediately be de-energized by simply releasing the bit and its associated mechanism to permit it to be reciprocated upwardly to automatically depress the stem 38 and open the circuit to the motor. It will also be apparent that the use of the particular type of switch assembly 32 which is proposed and its arrangement relative to the reciprocating portion of the drill press 10 permits the drill bit 16 to be automatically stopped at any time except that when it is actually in use in drilling a hole into a workpiece. The operator of the drill press need not move from his position in front of the press and adjacent the workpiece in order to easily start or stop the motor 20, and such starting or stopping may be automatically accomplished upon release by the operator of the head assembly 22. It will be thus apparent that, instead of requiring the operator to move and use one or both hands in stopping the operation of the drill press, the present invention permits the operator to regain the use of a hand which has previously been required to depress the head assembly 22 and its associated drill bit 16 when these portions of the drill press are released to automatically de-energize the motor 20.

In FIGURE 4 of the accompanying drawings, a modified embodiment of the invention is illustrated. In the modified embodiment, an internally threaded annulus or ring 60 is provided in the switch assembly 32 instead of the internally threaded cap 34. A set screw 62 extends through the ring 60 for permitting the ring to be set at any axial position desired along the graduated indexing bar 24. The ring 60 has secured thereto and projecting radially outward therefrom in a plane which extends normal to the path of reciprocation of the graduated indexing bar 24, a flat plate 64 which carries a housing 66 which holds the cammed member 40 and contact elements of the switch assembly 32. The protuberance or stem 38 of the switch assembly projects upwardly from the housing 66. The stop plate 46 is, as in the embodiment shown in FIGURES 1 and 2, secured to the side of the head assembly 22 and projects across the path of movement of the stem 38.

The general operation of the switch assembly 32 of the invention is the same in the case of the embodiment shown in FIGURE 4 as in the case of the embodiment hereinbefore described and depicted in FIGURES 1 and 2. The FIGURE 4 embodiment of the invention, however, permits the stroke of the reciprocating elements of the drill press to be adjusted in the sense of the free stroke traverse which exists between the workpiece and the upper limit of movement of the reciprocating elements. Thus, by adjusting the axial position of the ring 62 on the indexing bar 24, a longer stroke may be permitted to exist between the position occupied by the drill bit 16 when it is being used to drill into the workpiece and the uppermost position thereof where the stem 38 of the switch assembly 32 abuts against the stop plate 46. In situations in which very close control over the rotation of the drill bit 16 is desired, this feature of adjustability of the reciprocating stroke of the bit between energized and de-energized status is quite helpful.

Figure 6:
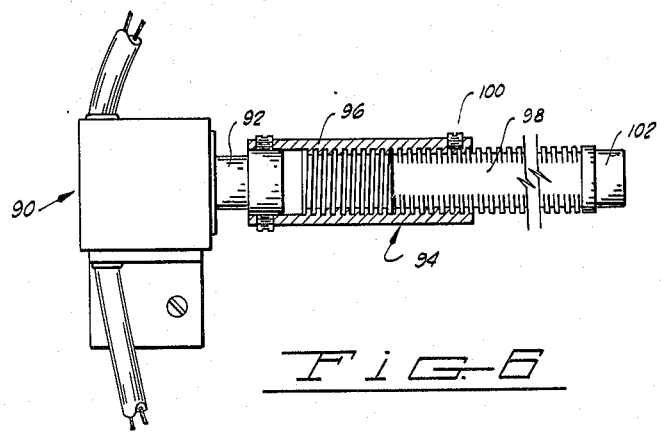
FIGURE 6 is a longitudinal sectional view taken through a portion of the switch assembly utilized in the radial saw illustrated in FIGURE 5.

Another embodiment of the invention is illustrated in FIGURES 5 and 6 of the drawings. In this embodiment of the invention, the basic principle of the invention is incorporated in a radial saw assembly of the type generally designated by reference character 70 in FIGURE 5 of the drawings. The assembly includes a radial saw 72 which is carried by a head assembly 74 reciprocably mounted upon a stand designated generally by reference character 76. The head assembly 74 reciprocates along an elongated arm 78 which is connected through a journal block 80 to an upstanding, generally cylindrical post 82. A horizontal platform 84 is provided on the stand 76 for the purpose of supporting a workpiece to be sawed by the radial saw 72. A spring 86 or other suitable resilient biasing means is connected between the head assembly 74 and the journal block 80 of the saw assembly and functions to bias the saw in reciprocating movement away from the end of the arm 78 toward the upstanding post 82.

In radial saw assemblies of the type heretofore proposed, no biasing means analogous to the spring 86 has been provided so that a slight departure of the stand 76 from horizontal positioning on the floor or other surface upon which it rests could result in the saw slowly moving down the arm 78 toward the outer or free end thereof. Also, even when the stand 76 was in perfect level, vibrations of the saw as it was rotating could cause the saw to move slowly outwardly toward the end of the arm 78. Both of these conditions, of course, constitute an extreme safety hazard.

According to the teaching of the present invention, there is provided in association with the spring 86, a switch assembly 90 of the same general type as the switch assembly 32 shown in FIGURES 1, 2 and 4. The switch assembly 90 is mounted on the journal block 80 in a position aligned with the path of reciprocating movement of the head assembly 74. Thus, as the saw is moved to a position approaching its limit of movement along the arm 78, the head assembly 74 will contact the stem 92 of the switch assembly 90. As hereinbefore explained, successive depressions of the stem 92 will cause the switch assembly 90 to alternately open and close the electrical circuit to the motor which drives the radial saw 72 in rotation.

In the operation of the improved radial saw assembly illustrated in FIGURE 5 of the invention, the operator of the saw may, prior to energizing the motor which drives the saw, adjust the workpiece and bring the inoperative saw to the edge of the workpiece to be certain that the path of movement of the saw is aligned as desired. A substantial advantage is realized in operation of the saw in this manner over the customary procedure heretofore used of the operator going around the saw to the place where the switch to the electrical motor is located, energizing the motor to start the saw and then attempting to align the workpiece while the saw is spinning or rotating rapidly.

After the workpiece has been aligned with the path of the saw in the manner desired, the head assembly 74 is reciprocated along the arm 78 toward the upstanding post 82 until the head assembly contacts the stem 92 of the switch assembly 90. Upon depression of the stem 92, the electrical motor 93 is started to place the saw 72 in motion. The saw 72 is then pulled toward the workpiece using the handle attached to the head assembly 74 and the alignment adapted while the saw was inoperative is maintained as the saw cuts through the workpiece. If the operator should be careless and release the handle during the sawing operation, the spring 86 will slowly bias the head assembly 74 and the saw 72 toward the upstanding post 82 until the head assembly strikes the stem 92 to open the switch assembly 90 and de-energize the motor which drives the saw. The same safety feature obtains, of course, when the operator is changing workpieces, or is not actively engaged in sawing a particular workpiece. The saw and its head assembly 74 after each use will be automatically returned to the inoperative position adjacent the upstanding post 82 and contact of the head assembly 74 with the stem 92 will cause the electric motor to be de-energized.

A slightly modified embodiment of the switch assembly 90 which is well-adapted for use in conjunction with a radial saw assembly of the type shown in FIGURE 5 is illustrated in FIGURE 6. In referring to FIGURE 6, it will be perceived that the stem 92 of the switch assembly 90 is provided with a tubular extension element 94 of adjustable length. The extension element 94 comprises an internally threaded tubular section 96 and an externally threaded cylindrical rod 98 which is threaded into the tubular member 96. A set screw 100 extends through the tubular member 96 for engagement with the rod 98 so that its axial adjustment relative to the tubular member 96 may be fixed. A contact cap 102 is provided on the outer or free end of the rod 98.

Through the use of the modified embodiment of the switch assembly 90 which is shown in FIGURE 6, the length of the free reciprocating stroke of the head assembly 74 and the radial saw 72 may be adjusted as desired by an operator. In some instances, it will prove convenient to reduce the distance which the head assembly 74 must travel along the arm 78 before contacting the switch assembly 90 to de-energize or energize the electric motor.

In FIGURES 7 through 9 of the drawings, there is illustrated a different type of switch which may be used in the power tool assembly of the invention. The switch comprises a housing 104 which encloses the switch mechanism as illustrated in FIGURES 7 and 8. A pair of electrical contacts 106, 108 are supported from one of the walls of the housing 104. The contact 106 is a spring metal electrical conductor which is engaged by a four lobed cam 110 carried on a shaft 112 extending through the housing 104. Also carried by the shaft 112 is a ratchet wheel 114 which is made rotatable with the cam 110. The ratchet wheel 114 is rotated by a pawl 116 which carries a spur 118 to assist the main projection of the pawl in turning the ratchet wheel. The pawl 116 is secured to and carried by a spring metal actuating arm 120 which is secured at one of its ends to the housing 104 by a bolt 122 and spacer element 124. A contact button 126 is carried by the actuating arm 120 at its free end, and is contacted by the relatively moving elements of the power tool assembly to energize and de-energize the switch in the manner hereinafter described.

The bolt 122 after it passes through the housing 104 is also used to secure to the housing 104 a spring metal dog 130 which projects into the path of the ratchet wheel 114 and engages the teeth thereof to prevent rotation of the ratchet wheel in a counterclockwise direction as it is viewed in FIGURES 7 and 8. For the purpose of disengaging the dog 130 from the ratchet wheel 114, a small cam element 132 is mounted upon a shaft 134 which extends through the housing 104 and is rotatably journaled therein. The cam 132 is positioned over the dog 130 for biasing the dog downwardly and out of engagement with the ratchet wheel when a handle 136 carried by the shaft 134 at its end outside the housing 104 (see FIGURE 9) is pivoted downwardly.

In using the switch illustrated in FIGURES 7 through 9 in the power tool assembly of the invention, the housing 104 with the switch mechanism inside is mounted, for example, on the head assembly 22 of the drill press illustrated in FIGURE 1 in approximately the same location as the stop plate 46, or, in the case of the radial saw shown in FIGURE 5, at about the same position as the switch 90 there shown. The contact button 126 of the spring metal actuating arm 120 is aligned with the upper end of the indexing bar 24 in the case of the drill press, and with the head assembly 74 in the case of the radial saw so that the reciprocation of the respective cutting elements of the power tool will in either case actuate the switch by moving the spring metal actuating arm 120 when the cutting element is reciprocated away from the workpiece.

In using the form of switch shown in FIGURES 7 through 9, the switch may be operated to function in the same manner as the switch hereinbefore described, and illustrated in FIGURE 3—that is, to alternately energize and de-energize the motor driving the power tool as the cutting member is consecutively reciprocated away from the workpiece. However, the type of switch illustrated in FIGURES 7 through 9 allows an additional and alternate mode of operation in which each and every reciprocation of the cutting element of the power tool away from the workpiece, and in a direction to bias the spring metal actuating arm 120 toward the housing 104, will function to open the electrical circuit and de-energize the motor (in the nature of a conventional limit switch).

As has been explained, it is frequently desirable in commencing to drill a hole or holes in a workpiece, to spot the drill bit with respect to the workpiece, that is, to determine as precisely as possible the exact point at which the point of the bit is to touch the workpiece prior to the actual energization of the tool to cause the bit to rapidly rotate. Considerably greater precision can be obtained by such preliminary spotting. In using the form of the present invention which includes the type of switch illustrated in FIGURES 7 through 9, the pawl element 132 is first positioned as shown in FIGURES 7 and 8 by properly positioning the handle 136 on the shaft 134. With the pawl element 132 in this position, the dog 130 is extended to engage the teeth of the ratchet wheel 114.

As previously explained, at the commencement of a drilling operation, the motor of the tool will normally be de-energized. This will mean that the switch illustrated in FIGURES 7 through 9 is in its off or circuit-breaking position which is that position illustrated in FIGURE 8. In this position, the dog 130 is retaining the ratchet wheel 114 in the illustrated position against rotation in a counterclockwise direction. The cam 110 is secured to the ratchet wheel 114 for rotation therewith, and is therefore also retained by the dog 130 in the position illustrated in FIGURE 8. This assures that the spring metal contact 106 will be biased upwardly out of engagement with the contact 108 and that the circuit will be open. The operator is at this time free to pull the drill bit downwardly and align the point of the bit with the exact spot on the workpiece where the hole is to be drilled.

When the spot to be drilled has been correctly aligned with the drill bit, the workpiece is secured firmly in place and the drilling operation may be commenced by merely releasing the head assembly 22, chuck 18, drill bit 16 to allow these members to be reciprocated upwardly under the influence of the spring or other biasing member contained in the head assembly 22. As the described elements move upwardly, the graduated indexing bar 24 strikes the contact button 126 on the spring metal actuating arm 120 and biases the pawl 116 upwardly in the housing 104. The upward movement of the pawl 116 results in the clockwise rotation of the ratchet wheel 114 and the cam 110. Upward movement of the pawl 116 brings the spur 118 into contact with one tooth of the ratchet wheel 114 and maintains continuous engagement of the pawl 116 with the ratchet wheel. One upward reciprocation of the pawl 116 is effective to rotate the shaft 112 through an arc of 45°, and thus brings one of the four flat surfaces of the cam 110 into parallelism with the spring metal contact 106. This permits the contacts 106 and 108 to be closed and the circuit to be closed to the motor which drives the drill press. Thus, the drill is automatically energized and the operator now need only bring it down to the precise spot which has already been spotted on the workpiece in order to drill a hole in the workpiece at the exact location desired. If the operator desires to stop the drill, he need only release the head assembly 22, chuck 18 and drill bit 16 and allow these members again to reciprocate upwardly and bias the spring metal actuating arm 120 upwardly to again rotate the shaft 112 by 45°. This will return the switch mechanism to the position shown in FIGURE 8 and open the circuit to the motor of the power tool.

It will be perceived that the switch shown in FIGURES 7 through 9 will, when the pawl element 132 is in the position shown in FIGURES 7 and 8, operate precisely like the switch shown in FIGURE 3 of the drawings and that the same safety advantages which have been attributed to the FIGURE 3 switch characterize the switch of FIGURES 7 through 9. In some types of work with power tools, however, it may frequently be desirable to have, instead of the type of switch operation previously described, a switch in which each upward reciprocation (or reciprocation away from the workpiece) of the rotating cutting element of the tool will automatically de-energize the tool by opening the electrical circuit to the motor. In other words, in some instances it is desirable to have merely a common limit switch which will stop the operation of the tool each time the cutting element is reciprocated away from the workpiece, rather than a switch which will alternately energize and de-energize the motor upon consecutive reciprocations in this direction.

To this end, the shaft 134 and cam 132 are provided. When the shaft 134 is rotated using the crank 136, the cam 132 functions to bias the spring metal dog 130 downwardly and out of engagement with the teeth of the ratchet wheel 114. Therefore, the spring metal contact 106 will be biased upwardly to open the circuit only when the spring metal actuating arm 120 and pawl 116 are moved and held upwardly by the positive action of the indexing bar 24, or the head assembly, or other element moving in reciprocation with the cutting tool away from the workpiece. When the moving portion of the power tool assembly reciprocates toward the workpiece and away from the switch, the spring metal actuating arm 120 returns to the position shown in FIGURE 8, and the spring metal contact 106 returns to the position shown in FIGURE 7 and thus biases the four lobed cam element 110 back to the position shown in FIGURE 7. The dog 130 is positioned out of alignment with the teeth of the ratchet wheel 114 and affords no interference with such counterclockwise movement of the ratchet wheel 114 and cam 110. Thus, the action occurring is simply the opening of the circuit to the motor driving the power tool when the cutting element of the tool reaches the end of its reciprocating stroke away from the workpiece, and the closure of the circuit each time the cutting element moves back toward the workpiece in its reciprocating stroke. The value of the novel switch element shown in FIGURES 7 through 9 in permitting greater flexibility of operation in the power tool will be apparent to those skilled in the art.

Another type of switch which may be used in the power tool assembly of the present invention is illustrated in FIGURES 10 through 17. The switch comprises a housing 140 which encloses a pair of arms designated generally by reference characters 142 and 144. The arm 142 is pivotally secured at one of its ends 146 to the wall of the housing 140, and carries at its other end a downwardly projecting leg 148 which is notched as indicated by reference character 150 for a purpose hereinafter described. The arm 144 is generally L-shaped in configuration with one of its legs 152 pivotally attached at one end 154 thereof to the housing 140.

The second leg 156 of the L-shaped arm 144 is of a length such that the leg 156 engages the downwardly projecting portion 148 of the arm 142 in the manner shown in FIGURE 10 at one point during the mutual pivotation of arms 142 and 144. Adjacent its free end, the leg 156 also is notched as indicated by reference character 160. The relative lengths and positions of mounting of the arms 142 and 144 are such that during their pivotal movements, the notches 150 and 160 in the two arms each pass through a tangent to their arcs of pivotation represented by the left hand dashed line in FIGURES 10–14.

The leg 152 of arm 144 carries an electrical contact 162 and the leg 152 is preferably made of an insulated material to insulate the electrical contact 162 from the housing 140. A spring or other resilient member 164 is attached to the housing and to the leg 156 of the L-shaped arm 144 to constantly bias the arm downwardly about the pivotal axis thereof. A second electrical contact 166 is secured to the housing 140 by an insulating block 170 and both the contacts 162 and 166 are connected to electrical leads 172 in the circuit to the electrical motor (not shown) which drives the power tool. A shaft 174 projects through the housing 140 from one side to the other and is rotatably journaled therein. The shaft 174 carries a cam element 176 having a flat side thereon for a purpose hereinafter described. At its free end outside the housing 140, the shaft 174 is bent to provide a handle 178 as illustrated in FIGURES 15 and 17.

In a preferred embodiment of the invention, the electrical contacts 162 and 166 take the form illustrated in FIGURE 16 in which the stationary contact 166 is formed of a pair of spring metal members which resiliently grip the contact 162 when the contacts are engaged by movement of the contact 162 through the open mouth formed by the spring metal elements used to construct contact 166.

For the purpose of actuating the switch upon movement of the cutting element of the power tool assembly, a spring metal dog 180 is secured to the moving portion of the power tool assembly and is formed and oriented on the tool so that it contacts the notches 148 and 160 in the arms 142 and 144, respectively, upon reciprocation of the cutting element of the tool away from the workpiece. As illustrated by way of example in FIGURES 10 through 14, the spring metal dog 180, when used on a drill press of the type shown in FIGURE 1, may be attached to the indexing bar 24 using a pair of lock nuts 182. The configuration of the spring metal dog 180 should be such that as the cutting element of the tool moves away from the workpiece and following the time that the free end of the dog 180 contacts one of the notches in the arms 142 and 144, the spring metal dog 180 will be bent out of its normal at rest position in the manner illustrated in FIGURE 10. The housing 140 containing the moving elements of the switch embodiment illustrated in FIGURES 10 through 14 will be mounted upon a stationary or non-moving portion of the power tool assembly, such as the head assembly 22 in the drill press illustrated in FIGURE 1 of the drawings, or the journal block 80 of the radial saw illustrated in FIGURE 5.

The several operating positions of the switch under description are illustrated in FIGURES 10 through 14. The switch may be said to have two basic operating statuses which, for purposes of description, will be termed the spot status and the automatic start status. The value of spotting the exact location or position on the workpiece where a hole is to be drilled at a time when the drill bit is de-energized has previously been explained herein. In order to permit such spotting operation to be carried out, the switch is placed in the spot status by rotating the handle 178 on the shaft 174 to the position illustrated in FIGURE 15, or 180° from the position illustrated in FIGURE 17. With the shaft 174 in this position, the cam 176 is positioned as shown in FIGURES 10 through 13 and thus does not engage the arm 142. The arm is thus free to pivot to a position in which it rests upon the arm 144. This position is illustrated in FIGURE 10. The FIGURE 10 position of the switch will be that which is occupied by the switch elements when the handle 178 is rotated to the spot position and when the drill press or power tool is not being utilized. Thus, the contacts 162 and 166 are open and the electrical motor which drives the power tool is de-energized.

When the operator desires to spot the hole which is to be drilled in the workpiece, the head assembly 22, chuck 18 and drill bit 16 are pulled downwardly so that the point of the drill is brought into registry with the point on the workpiece where the hole is to be drilled. Reciprocation of the head assembly and associated elements toward the workpiece disengages the spring metal dog 180 from the notch 160 of the arm 144 and allows the arms 144 and 142 to remain in their FIGURES 10 and 11 relationship. The arm 144 is retained in the position to which it is pivoted in FIGURE 10 by the interlock which is formed between its free end and the downwardly depending portion 148 of the arm 142.

After the point to be drilled is spotted on the workpiece and the workpiece is firmly secured in position, the head assembly 22 is released and is permitted to reciprocate away from the workpiece so as to move upwardly and engage the notch 150 in the downwardly depending portion 148 of the arm 142. This action pivots the arm 142 upwardly so that the arm 144 is released from engagement therewith and falls downwardly to the position shown in FIGURE 12. The downward movement of the arm 144 is arrested by abutment of the electrical contact 162 with the contact 166. Closing of the contacts 162 and 166 in turn energizes the electrical motor of the power tool assembly and places the cutting element thereof in motion. The operator can now again depress the head assembly 22 or, more generally speaking, commence to move the cutting element of the power tool assembly toward the workpiece in order to perform the cutting or piercing operation desired.

Such movement of the cutting element toward the workpiece will permit the arm 142 to pivot downwardly and come to rest on the upper side of the arm 144 as illustrated in FIGURE 13. At such time as the operator may desire for any reason to terminate the cutting or piercing operation being performed upon the workpiece, he has merely to release the head assembly and thereby permit the cutting member to move away from the workpiece and toward the notch 160 formed in the lower arm 144. In the case of the drill press illustrated in FIGURE 1, as the indexing bar 24 moves upwardly, the spring metal dog 180 engages the notch 160 formed in the arm 144 and biases this arm upwardly until the relationship of the arms 142 and 144 shown in FIGURE 10 of the drawings is reassumed. At this time, the spring metal dog 180 is bent out of its normal unstressed position as illustrated in FIGURES 11 through 13 to the position shown in FIGURE 10. It will be perceived that this movement of the head assembly and other moving elements of the power tool assembly in moving away from the workpiece has the effect, toward the end of the reciprocating stroke, of opening the circuit to the electrical motor and therefore de-energizing the tool. Thus, if for any reason the cutting element of the tool becomes fouled or jammed in the workpiece, the operator need merely release the downward pressure on the head assembly and permit the biasing element of the assembly to reciprocate the head assembly 22, chuck 18 and drill bit away from the workpiece to the position shown in FIGURE 10 to automatically stop the tool.

From the description of the switch illustrated in FIGURES 10 through 14 thus far, it will be apparent that the switch may function in a manner identical to the function of the type of switch illustrated in FIGURE 3 of the drawings. However, the switch is also capable of functioning as an ordinary limit switch, and this function may be employed when the handle 178 is pivoted to the automatic start position as shown in FIGURE 17. In this position of the handle 178, the shaft 174 is rotated through 180° to bring the flat side of the cam 176 into engagement with the flat underside of the arm 142. This movement of the cam 176 biases the arm 142 upwardly about its pivotal axis so that it occupies the position shown in FIGURES 14 and 17 of the drawings. With the arm 142 thus positioned, no coaction can occur between the arms 142 and 144 and the position of the arm 144 is always determined solely by the biasing influences of the spring 164 and the spring metal dog 180. Thus, when the cutting element of the power tool is reciprocated away from the workpiece, the spring metal dog 180 will engage the notch 160 in the arm 144 and pivot the arm upwardly about its pivotal axis 154. This will open the contacts 162 and 166 to de-energize the power tool and place the switch in the operating position illustrated in FIGURE 14. In other words, each time the cutting element and its supporting assembly are permitted to reciprocate away from the workpiece, the switch will be opened near the end of such reciprocating stroke to de-energize the tool. Converseley, as the cutting element and its supporting assembly are moved toward the workpiece and away from the switch, the arm 144 is permitted to pivot downwardly under the biasing influence of the spring 164 until it occupies the position illustrated in FIGURE 12 of the drawings. At this time, the contacts 162 and 166 are closed and the motor which drives the power tool is energized. Thus, the tool is automatically started each time the cutting element is moved toward the workpiece.

From the foregoing description of the two types of novel switches illustrated in FIGURES 7 through 9 and 10 through 17, it will be apparent that the use of these switches permits a considerably greater degree of versatility to be obtained in the operation of power tool assemblies incorporating the switches. It is to be understood that applicant recognizes the previous employment of simple limit switches in some types of power tools for the purpose of stopping the cutting element at such time as the cutting element is not being used to piece or cut a workpiece. However, the combination of such limit switch arrangement with the consecutive on-off switch of the type shown in FIGURE 3 is believed to be novel and to greatly improve the efficiency and safety with which power tool assemblies of the general type described may be operated.

From the foregoing description of the invention, it is believed that it will be readily apparent that the present invention provides apparatus which substantially enhances the safety and efficiency with which certain types of power tools may be operated. The invention is not claimed to be a complicated one nor one which is particularly subtle nor obscure. Nevertheless, it is believed to constitute a valuable advance in the art and to be deserving of the protection afforded by the patent laws.

Although certain changes and innovations may be made in the structure hereinbefore described and illustrated by way of example in the drawings, it is intended that such changes and modifications shall be encompassed by the scope of the present invention unless such changes are sufficiently far-reaching to depart from reliance upon the basic principles underlying the invention.

I claim:

1. An electrically powered tool for performing a cutting operation on a workpiece comprising:
   (a) a cutting element for cutting the workpiece;
   (b) a stand adapted to support said workpiece in alignment with said cutting member;
   (c) a head assembly rotatably journaling said cutting member and reciprocally mounted on said stand for reciprocation toward and away from a workpiece supported on the stand;
   (d) an electrical motor for driving said cutting member in rotation; and
   (e) switch means in the electrical circuit to said electrical motor and positioned on one portion of said tool for actuation by contact with a second portion of said tool which moves relative to said first mentioned portion during reciprocation of said head assembly, said switch means including a pair of electrical contacts in the electrical circuit of said motor, and means alternately opening and closing said contacts during each consecutively reciprocating stroke of said head assembly away from said workpiece.

2. An electrically powered tool as claimed in claim 1 wherein said switch means is further characterized to include an operating mechanism movable between a first position of engagement with said contact opening and closing means and a second position of non-engagement therewith, and cooperating in said first position with said contact opening and closing means to open said contacts during reciprocation of said head assembly away from said workpiece and close said contacts during reciprocation of said head assembly toward said workpiece.

3. An electrically powered tool as claimed in claim 1 wherein said switch means is mounted on said reciprocating head assembly for movement therewith.

4. An electrically powered tool as claimed in claim 1 wherein said switch means is mounted on said stand and is fixed against movement with said reciprocating head assembly.

5. An electrically powered tool as claimed in claim 1 and further characterized to include means for yieldingly biasing said head assembly in reciprocation away from said workpiece.

6. An electrically powered tool as claimed in claim 1 wherein said switch means comprises:
   (a) a resilient actuating arm supported at one end and freely movable at its other end with said freely movable end aligned with said second portion of the tool;
   (b) a shaft;
   (c) a cam carried by said shaft and rotatable about the axis of said shaft, said cam having a plurality of lobes circumferentially spaced around the periphery thereof and further radially removed from the axis of said shaft than the peripheral surfaces of said cam between said lobes;
   (d) a ratchet wheel around said shaft and rotatable with said cam about the axis of said shaft;
   (e) pawl means extending between said actuating arm and said ratchet wheel and engaging the teeth of said ratchet wheel to rotate said ratchet wheel and said cam through one-half the angular distance between said lobes when the freely movable end of said actuating arm is biased toward said ratchet wheel;
   (f) a fixed first electrical contact;
   (g) an elongated, resilient second contact supported at one end and freely movable at the other end with said other end touching said first contact when the electrical circuit through said contact is closed, said resilient second contact by being positioned for engagement by said cam and biased by the lobes of said cam out of contact with said first contact; and
   (h) a dog engaging the teeth of said ratchet wheel and permitting rotation of said ratchet wheel in a direction opposite that in which said ratchet wheel is rotated by said pawl means.

7. An electrically powered tool as claimed in claim 6 wherein said elongated resilient contact is positioned to be resiliently deformed by the lobes of said cam during the rotation of said ratchet wheel by said pawl, and wherein said cam and said ratchet wheel are resiliently biased by said resilient contact in a direction of rotation opposite the direction of their rotation by said pawl means, and further characterized to include means for biasing said dog out of alignment with said ratchet wheel whereby said ratchet wheel may rotate in a direction opposite that in which it is rotated by said pawl means.

8. An electrically powered tool as claimed in claim 1 wherein said head assembly reciprocates in a vertical plane and wherein said switch means comprises:
   (a) a first elongated arm pivotally secured at one of its ends to said one portion of the tool for pivotation in a vertical plane;
   (b) a latch portion projecting downwardly from the free end of said first arm and pivoting through an arc passing through the line of movement of said second portion of the tool relative to said one portion of the tool for contact with and pivotation by said second portion during an increment of the relative movement between said one portion and said second portion;
   (c) a second arm pivotally secured at one of its ends to said one portion of the tool for pivotation in a vertical plane and having engaging means at its other end for engaging said second portion of the tool during an increment of the relative movement between said first portion and said second portion when said head assembly moves away from said workpiece, said engaging means being moved during pivotation of said second arm in an arc intersecting at one point the line of movement of said second portion relative to said first portion, said second arm being spaced vertically downwardly from said first arm, and said first and second arms having their pivotal axes positioned relative to each other such as to cause the arcs of movement of said latched portion and said engaging means to cross at a point spaced toward the pivotal axes of said arms from said line of movement of said second portion relative to said first portion whereby said latch portion may overhang and interlock with the free end of said second arm to prevent downward pivotation of either arm when said latch portion is in said line of movement;
   (d) resilient means connected to said second arm between its ends and biasing said second arm downwardly about its pivotal axis; and
   (e) electrical contact means mounted on said one portion and said second arm for alternately opening and closing upon upward and downward pivotation of said second arm, respectively.

9. An electrically powered tool as claimed in claim 8 and further characterized to include means for pivoting said first arm upwardly to a position clear of the path of pivotal movement of said second arm whereby interlocking of said arms is obviated.

10. An electrically powered tool as claimed in claim 9 wherein said means for pivoting said first arm comprises:
   (a) a shaft rotatably journaled in said one portion of the tool and extending under said first arm between the ends thereof; and
   (b) a cam carried by said shaft and aligned with said first arm for pivotally biasing said first arm upwardly to said clear position.

11. In a workpiece-piercing, electrically powered tool of the type having a rapidly rotating cutting member secured in a head assembly mounted on a stand for reciprocation toward and away from a workpiece supported on the stand, and an electrical motor for driving said cutting member in rotation, the improvement which comprises:

(a) a switch mounted on one of the portions of said tool which moves relative to a second position of said tool when said cutting member and its associated head assembly are reciprocated, said switch having a circuit making position and a circuit breaking position, and further having a reciprocating stem cooperating with said second portion when said cutting member and head assembly are reciprocated away from said workpiece to alternately shift said switch to its circuit making position and circuit breaking position upon successive reciprocations of said switch.

12. In an electrical drill press of the type comprising a rotary drill bit mounted upon a support for reciprocating movement along the line of its longitudinal axis; a motor for driving the bit in rotation; resilient biasing means for biasing the drill bit in a direction away from its point and along its longtudinal axis; and an externally threaded graduated indexing bar extending parallel to the drill bit and reciprocally movable therewith; a device for improving the safety and accuracy with which said drill press may be operated comprising (a) an internally threaded cap threadedly connected to the end of said indexing bar opposite its end closest to the point of said drill bit;

(b) an electrical switch secured to said cap for movement therewith and connected in series with said motor, said switch having a single actuating protuberance projecting upwardly therefrom and operative to sequentially close then open the electrical circuit to said motor upon consecutive depressions of said protuberance; and (c) a stop plate secured to said support and extending across the line of movement of said indexing bar for contacting said switch protuberance as said drill bit and said indexing bar are moved in reciprocation in a direction away from the point of said drill bit along the longitudinal axis thereof by said resilient biasing means whereby said motor will be automatically stopped when an operator releases the drill bit while the motor is driving the drill bit in rotation.

13. The improvement in an electric drill press as claimed in claim 12 wherein said internally threaded metallic cap is adjustably engageable with said externally threaded graduated indexing bar whereby the distance between said protuberance and said plate may be adjusted.

14. In an electric drill press of the type comprising a rotary drill bit mounted on a support for reciprocating movement along the line of its longitudinal axis; a motor for driving the bit in rotation; resilient biasing means for biasing the drill bit in a direction away from its point and along its longitudinal axis; and an externally threaded indexing bar extending parallel to the drill bit and reciprocally movable therewith; a device for improving the safety and accuracy with which said drill press may be operated comprising (a) an electrical switch secured to said indexing bar and reciprocable therewith and with said drill bit, said switch having a single actuating protuberance projecting upwardly therefrom and operative to sequentially close then open the electrical circuit to said motor upon consecutive depressions of said protuberance; and (b) a stop plate secured to said support and extending across the line of movement of said indexing bar for contacting said switch protuberance as said drill bit and said indexing bar are moved in reciprocation in a direction away from the point of said drill bit along the longitudinal axis thereof by said resilient biasing means whereby said motor will be automatically stopped when an operator releases the drill bit while the motor is driving the drill bit in rotation.

15. In a workpiece-piercing electrically powered tool of the type having a rapidly rotating cutting element secured in a head assembly reciprocally mounted on a stand for reciprocation toward and away from a workpiece support on the stand, and an electrical motor for driving said cutting element in rotation, the improvement which comprises:

(a) a switch mounted on said stand in the path of reciprocation of said head assembly and positioned to contact said head assembly when the head assembly is reciprocated away from said workpiece, said switch having a circuit making position and a circuit breaking position, and further having a reciprocating stem cooperating with said head assembly when said head assembly is reciprocated away from said workpiece to alternately shift said switch to its circuit making position and circuit breaking position upon successive reciprocations of said cutting member.

16. The improvement claimed in claim 15 and further characterized to include means for yieldingly biasing said cutting element toward said switch.

17. The improvement claimed in claim 15 and further characterized to include means for adjustably positioning said switch relative to said workpiece whereby the length of the free reciprocating stroke head assembly between the workpiece and the switch may be adjusted as desired.

18. The improvement claimed in claim 17 and further characterized to include means for adjustably positioning said switch relative to said workpiece supporting platform whereby the length of the free reciprocating stroke of the saw between the workpiece supporting platform and the switch may be adjusted as desired.

19. In an electrically powered radial saw assembly of the type having a circular saw rotatably secured in a head assembly reciprocally mounted upon a stand having a workpiece supporting platform and an electrical motor for driving said saw in rotation, the improvement which comprises:

(a) a switch mounted on said stand in the path of reciprocation of said head assembly and spaced from said workpiece supporting platform, said switch having a circuit making position and a circuit breaking position, and further having a reciprocating stem cooperating with said head assembly when said head assembly is reciprocated away from said workpiece supporting platform to alternately shift said switch to its circuit making position and its circuit breaking position upon successive reciprocations of said head assembly; and (b) means resiliently biasing said saw in reciprocal movement toward said switch and away from said workpiece supporting platform.

No references cited.

WILLIAM W. DYER, JR., *Primary Examiner.*